United States Patent [19]

Purvis

[11] 4,070,426

[45] Jan. 24, 1978

[54] ACRYLIC MODIFIED FOAMED NYLON PRODUCT AND PROCESS

[75] Inventor: Marshall T. Purvis, Newtown, Pa.

[73] Assignee: Rohm and Haas Company, Philadelphia, Pa.

[21] Appl. No.: 780,201

[22] Filed: Mar. 22, 1977

Related U.S. Application Data

[63] Continuation-in-part of Ser. No. 495,956, Aug. 9, 1974, abandoned.

[51] Int. Cl.$^2$ ............... C08J 9/00; B29H 7/20
[52] U.S. Cl. ............... 264/54; 260/2.5 N; 260/2.5 E; 260/2.5 R; 260/2.3; 260/857 G; 260/857 D; 260/857 UN; 264/DIG. 5; 264/DIG. 83
[58] Field of Search ............... 260/2.5 N, 2.5 R; 264/54

[56] References Cited

U.S. PATENT DOCUMENTS

| | | | |
|---|---|---|---|
| 2,354,260 | 7/1944 | Haney et al. | 264/53 |
| 3,222,302 | 12/1965 | Bollert et al. | 260/2.5 N |
| 3,668,274 | 6/1972 | Owens et al. | 260/857 G |
| 3,796,771 | 3/1974 | Owens et al. | 260/857 G |

OTHER PUBLICATIONS

Bernhardt, Processing of Thermoplastic Materials, Reinhold Publishing Corp., 1959, p. 163.
Fisher, Extrusion of Plastics, Interscience Publishers, 1958, pp. 80–81.

Primary Examiner—Richard B. Turer
Attorney, Agent, or Firm—Michael B. Fein; Lester E. Johnson

[57] ABSTRACT

A method of making nylon (polycarbonamide) foam involving the use of a multi-phase carboxylic acid-containing polymer which reacts with the amine groups of the nylon to produce water which blows the foam during the process.

8 Claims, No Drawings

ACRYLIC MODIFIED FOAMED NYLON PRODUCT AND PROCESS

This application is a continuation-in-part application of our earlier filed and copending U.S. application Ser. No. 495,956, filed August 9, 1974, now abandoned and entitled "Acrylic Modified Foamed Nylon Product and Process."

BACKGROUND OF THE INVENTION

This invention relates to processes for making nylon foam and to the nylon foam produced by the processes.

Nylon foam has typically been produced by the inclusion of a blowing agent during extrusion. Typical extrusion processes employ vented extruders. Glass fiber reinforcement is almost always used in order to achieve the hot strength necessary to produce nylon foam of even moderately low densities. Owens et al, U.S. Pat. Nos. 3,668,274 and 3,796,771 teach a multi-phase amine-reactive carboxylic acid-containing polymer which is graftable to the amine groups of a polycarbonamide and to improve the impact resistance of the polycarbonamide as well as the hot strength to render to polymer extrudable, blow moldable, and injection moldable.

The present invention relates to an improvement of the Owens et al system wherein polycarbonamide foam is produced.

DETAILED DESCRIPTION AND THE PREFERRED EMBODIMENT

In summary the invention comprises a method of making polycarbonamide foam comprising extruding a blend of polycarbonamide and a multi-phase carboxylic acid-containing polymer in a non-vented extruder. In another aspect, the invention comprises a method of making polycarbonamide foam comprising introducing a blend of polycarbonamide and a multi-phase carboxylic acid-containing polymer in a compression mold, molding at a first pressure under heat so as to cause reaction between the amine groups of the polycarbonamide and the acid groups of the multi-phase polymer, then reducing the pressure as to cause the melted blend to foam due to steam being formed in situ. In still another aspect, the invention comprises the foam composition produced by the above-described methods.

The multi-phase carboxylic acid-containing polymers used can be any which increase the hot strength of the polycarbonamide to the proper degree and which also act as nucleating agents for gas formation. One particularly preferred class of multi-phase carboxylic acid-containing polymers is disclosed by Owens et al in U.S. Pat. Nos. 3,668,274 and 3,796,771. This class of polymers generally have a first elastomeric phase formed by polymerization of a monomer charge of 50 to 99.9 parts by weight alkyl acrylate wherein the alkyl group contains 1 to 15 carbon atoms, butadiene or substituted butadiene; 0 to 40 parts by weight of other ethylenically unsaturated monomers; and 0 to 5 parts by weight of a graft-linking monomer; and a final phase polymerized in the presence of said first phase from a monomer charge comprising 0.1 to 50 parts by weight of a copolymerizable carboxylic acid; 50 to 99.9 parts by weight of a member selected from the group consisting of alkyl methacrylates, styrenes, acrylonitrile, methacrylonitrile and olefins that, when homopolymerized, form polymers having a heat distortion temperature greater than about 20° C.; 0 to 50 parts by weight of another acrylic monomer; and 0 to 40 parts of another copolymerizable ethylenically unsaturated monomer.

The copolymerizable carboxylic acid is preferably acrylic acid or methylacrylic acid. The alkyl acrylate is preferably butyl acrylate or mixtures of alkyl acrylates. Further details and teachings relative to the carboxylic acid-containing polymers which are preferred for use in this invention can be found by referring to the above-mentioned patents.

The nylons (polycarbonamides) suitable in the present invention include those that are amine-terminated and are capable of reacting with the carboxylic acid-containing modifiers at their termination sites. Examples of suitable polycarbonamides are those prepared from polymerizable monoamino monocarboxylic acids or their amide-forming derivatives, or from suitable diamine and suitable dicarboxylic acids or from amide-forming derivatives of these compounds. The preferred polyamides are those wherein the intracarbonamide linkages are other than exclusively aromatic, i.e., there is at least one aliphatic —HCR— group in each repeating unit of the polymer molecule. The —R— group may be hydrogen, halogen, monovalent organic radical, alkylene or the like. Typical of such polyamides are those formed from an aliphatic diamine and an aliphatic acid containing the repeating unit $$-X-Z-Y-Z$$

wherein —X— and —Y— represent divalent aliphatic or cycloaliphatic groups and —Z— represents the

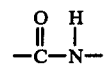

linkage. Polyhexamethyleneadipamide and polycaproamide (i.e. "6/6" and "6" nylons) are typical. Other suitable polyamides are those having the repeating structure —A—Z—X—Z where —A— is a divalent aromatic radical and —X— and —Z— are as previously defined. Polyhexamethylene terphthalamide is illustrative of such polymers. Additionally polyamides having repeated units such as —A—Z—B—Z and —X—Z—B—Z— wherein —B— is divalent alkaryl (such as xylene) may be used. Another class of suitable polyamides containing other than aromatic intracarbonamide repeating units are those prepared from piperazine, such as those from piperazine and adipic acid, piperazine and terephthalic acid, and the like. Copolyamides, condensation copolymers wherein the amide linkage is the predominate linkage and polyamide mixtures are also useful. In one aspect of the present invention, the polycarbonamide is "waste" or "scrap" nylon flock.

The blend of the multi-phase carboxylic acid-containing polymer and the polycarbonamide can be accomplished by either mixing the multi-phase polymer in the form of a powder with nylon chip or by mixing the composite latex dispersion or solution with polycarbonamide fiber flock or the polycarbonamide melt in an extruder. The melt temperature is maintained at about 230° to 300° C. when an extruder is used, and a reaction between the amine end groups of the polycarbonamide and the carboxylic acid groups of the multi-phase polymer takes place in the extruder with water as a by-product. The resultant extrudate can be cooled and used as an article such as corner molding or can be injection molded. It is important to carrying out the invention in the extruder that the extruder be non-vented. Owens et al disclose a vacuum vented extruder which is contrary to the present invention.

Another method of making the foam comprises introducing a blend of the polycarbonamide and the multi-phase polymer in a compression mold, molding at a first pressure under heat so as to cause reaction between the amine group of the polycarbonamide and the acid groups of the multi-phase polymer, preferably at about 230° to 300° C., then reducing the pressure so as to cause the melted blend to foam due to steam being formed in situ. The first pressure is preferably about 500 to 2000 psi whereas the reduced pressure is preferably about atmospheric.

Density of the polycarbonamide foams can be reduced to as low as 0.5 g./cc. and possibly lower. Unfoamed polycarbonamide generally has a density of about 1.1 and thus densities ranging from 1.0 to 0.5 can be achieved without the use of additional blowing agents. If lower densities are desired or necessary, additional blowing agents can be added to push the density lower. The additional blowing agents are any of those known in the art. When those additional blowing agents are employed, much less is necessary to achieve a desired density than in prior processes.

The weight ratio of multi-phase carboxylic acid-containing polymer to polycarbonamide suitable for use in this invention is about 0.01 to 0.99, preferably about 0.05 to 0.15.

The following examples are presented to illustrate a few embodiments of the invention.

EXAMPLE I

A multi-phase polymer having a first phase prepared from 70 parts butyl acrylate, 0.35 parts 1,3-butylene diacrylate, 0.28 parts allyl methacrylate, and a second phase prepared from 25 parts methylmethacrylate and 5 parts acrylic acid having an average particle size of about 2,000 A is prepared.

EXAMPLE II

A non-modified nylon resin having a melt index of 2.9 is extruded at a die temperature of 490° F. The extrudate does not readily retain the die shape and has a density of 1.1 g./cc.

EXAMPLE III

To the nylon resin of Example II is added azobisformamide, a chemical blowing agent, at the concentration level of 1 part per hundred, and extruded at the same die temperature as in Example II. The extrudate is foamed but does not readily retain the die shape and has a density of 0.74 g./cc.

EXAMPLE IV

To the nylon resin of Example II is added the multi-phase polymer of Example I in a weight ratio of 1 part multi-phase polymer to 9 parts nylon. The mixture is extruded at the same die temperature as in Example II. The foamed extrudate readily retains the die shape and has a density of 0.52 g./cc.

I claim:

1. A method of making polycarbonamide foam comprising extruding a blend of polycarbonamide, characterized as possessing amine end groups with recurring amide linkages, and a multiphase carboxylic acid-containing polymer, which has a first elastomeric phase formed by polymerization of a monomer charge of 50 to 99.9 parts by weight alkyl acrylate, wherein the alkyl group contains 1 to 15 carbon atoms, butadiene or substituted butadiene; 0 to 40 parts by weight of other ethylenically unsaturated monomers; 0 to 5 parts by weight of a graft-linking monomer; and a final phase polymerized in the presence of said first phase from a monomer charge comprising 0.1 to 50 parts by weight of a copolymerizable carboxylic acid; 50 to 99.9 parts by weight of a member selected from the group consisting of alkyl methacrylate, styrenes, acrylonitrile, methacrylonitrile, and olefins that, when homopolymerized, form polymers having a heat distortion temperature greater than about 20° C, in a non-vented extruder under conditions such that the carboxylic acid groups of said multiphase carboxylic acid-containing polymers react with the amine groups of acid polycarbonamide, said multiphase polymer having a final polymeric phase polymerized in the presence of a first polymeric phase, wherein the polycarbonamide foam has a density less than 1 without the use of added blowing agents.

2. Method of claim 1 wherein the exturdate is subsequently injection molded.

3. Method of claim 1 wherein the melt temperature is maintained at about 230° to 300° C.

4. The method of claim 1 wherein said copolymerizable carboyxlic acid is acrylic acid or methacrylic acid.

5. The method of claim 5 wherein said alkyl acrylate comprises butyl acrylate.

6. Method of claim 1 wherein chemical, liquid, or gaseous blowing agent is further added to the blend during extrusion.

7. The foam composition produced by the method of claim 1.

8. A method of making polycarbonamide foam comprising introducing a blend of polycarbonamide, characterized as possessing amine end groups with recurring amide linkages, and a multiphase carboxylic acid-containing polymer, which has a first elastomeric phase formed by polymerization of a monomer charge of 50 to 99.9 parts by weight alkyl acrylate, wherein the alkyl group contains 1 to 15 carbon atoms, butadiene or substituted butadiene; 0 to 40 parts by weight of other ethylenically unsaturated monomers; 0 to 5 parts by weight of a graft-linking monomer; and a final phase polymerized in the presence of said first phase from a monomer charge comprising 0.1 to 50 parts by weight of a copolymerizable carboxylic acid; 50 to 99.9 parts by weight of a member selected from the group consisting of alkyl methacrylate, styrenes, acrylonitrile, methacrylonitrile, and olefins that, when homopolymerized, form polymers having a heat distortion temperature greater than about 20° C, in a compression mold, molding at a first pressure under heat so as to cause reaction between the amine groups of the polycarbonamide and the acid groups of the multiphase polymer, then reducing the pressure so as to cause the melted blend to foam due to steam being formed in situ, wherein the polycarbonamide foam has a density less than 1 without the use of added blowing agents.

* * * * *